United States Patent
Jay et al.

(10) Patent No.: US 6,917,970 B2
(45) Date of Patent: Jul. 12, 2005

(54) METHOD AND PROGRAM CODE FOR IDENTIFYING NEW NODES ON A BUS FOLLOWING A RESET

(75) Inventors: Stephen A. Jay, Woburn, MA (US); Srinivas Madhur, Westford, MA (US); Mark R. Johnson, Nashua, NH (US); Diana C. Klashman, Milford, MA (US)

(73) Assignee: Sun Microsystems, Inc., Santa Clara, CA (US)

( * ) Notice: Subject to any disclaimer, the term of this patent is extended or adjusted under 35 U.S.C. 154(b) by 875 days.

(21) Appl. No.: 09/802,628

(22) Filed: Mar. 9, 2001

(65) Prior Publication Data

US 2002/0174275 A1 Nov. 21, 2002

(51) Int. Cl.[7] .................................. G06F 15/177
(52) U.S. Cl. ..................................... 709/220
(58) Field of Search .............................. 710/301–304, 710/104; 709/220–226; 713/1–100; 715/734

(56) References Cited

U.S. PATENT DOCUMENTS

| | | | | |
|---|---|---|---|---|
| 5,049,873 A | * | 9/1991 | Robins et al. | 340/825.01 |
| 5,764,930 A | * | 6/1998 | Staats | 710/107 |
| 5,963,739 A | | 10/1999 | Homeier | 395/704 |
| 6,002,869 A | | 12/1999 | Hinckley | 395/704 |
| 6,038,378 A | | 3/2000 | Kita et al. | 395/183.14 |
| 6,063,132 A | | 5/2000 | DeCamp et al. | 716/5 |
| 6,131,119 A | * | 10/2000 | Fukui | 709/224 |
| 6,205,122 B1 | * | 3/2001 | Sharon et al. | 370/254 |
| 6,378,000 B1 | * | 4/2002 | Akatsu et al. | 709/245 |
| 6,405,247 B1 | * | 6/2002 | Lawande et al. | 709/221 |
| 6,574,663 B1 | * | 6/2003 | Bakshi et al. | 709/223 |
| 6,606,630 B1 | * | 8/2003 | Gunlock | 707/100 |
| 6,678,781 B1 | * | 1/2004 | Domon | 710/312 |
| 6,748,429 B1 | * | 6/2004 | Talluri et al. | 709/221 |

FOREIGN PATENT DOCUMENTS

| | | | | |
|---|---|---|---|---|
| EP | 637152 A1 | * | 2/1995 | H04L/12/56 |
| JP | 2000253036 A | * | 9/2000 | H04L/12/44 |

OTHER PUBLICATIONS

P1394.1 Draft Standard for High Performance Serial Bus Bridges, P1394.1 Draft 0.15, Jan. 11, 2001, IEEE.

* cited by examiner

*Primary Examiner*—Paul R. Myers
(74) *Attorney, Agent, or Firm*—Meyertons Hood Kivlin Kowert & Goetzel, P.C.; B. Noël Kivlin

(57) ABSTRACT

After a reset on a bus, the topologies of nodes on the bus before and after the reset are accessed to identify nodes that are new to the bus. A host identifies itself in both the new topology data and the old topology data. Referring to the connectedness between ports of a node and other ports in the new topology, similarly connected nodes in the old topology are identified as matching. Identifying data present in the old data can be assigned to the corresponding node in the new data. Any nodes in the new tree lacking a matching node will require requests over the bus to obtain its identification data.

18 Claims, 7 Drawing Sheets

METHOD AND PROGRAM CODE FOR IDENTIFYING NEW NODES ON A BUS FOLLOWING A RESET

FIELD OF THE INVENTION

The invention generally relates to device identification on a bus after a reset, in particular, on a 1394 bus.

BACKGROUND OF THE INVENTION

With a number of devices connected together over a bus, it is often useful to know the identities of each device. The particular identity of a device can be useful to a host that has to send data to that device. With knowledge of the device, the host can load the appropriate device driver for interacting with that device.

On a 1394 bus, also known as Firewire, a reset signal on the bus initiates a tree identification and self identification of all nodes on the bus. The tree identification process distributes to the nodes the connectedness between the various nodes. It indicates which ports are connected to which other ports and labels each node as a parent or child. In the self-identification process, each node has an opportunity to select a unique physical I.D. for building a system topology map. For example, each node will receive a number from 0 to N−1, where N is the number of nodes on the bus. In accordance with the self-identification process on the 1394 bus, the root node identified during tree identification passes control to its lowest numbered connected port and waits for that node to finish the identification of each of the child nodes on that port. The root node then passes control to the next highest port and waits for the nodes on that port to finish. When the nodes attached to all ports are finished, the root node itself does a self-identify. Each of the child nodes on the branches does the self-identification process with respect to its own child nodes in the same way as the root node.

A node doing a self identify sends its physical I.D. information out over the bus. The physical I.D. selected by a node is simply the count of the number of times the node has passed through the state of receiving self I.D. information from others before having its own opportunity to send self I.D. information.

As a result of the tree identification and self identification processes, the topology is determined and communicated to each of the connected nodes. The information communicated to each of these nodes consists of the physical I.D. of every node and its port connectedness information, i.e., whether a node's port is a parent port, a child port, an unconnected port or unimplemented port. The topology describes a tree of connections between the ports of the various nodes on the bus. There has been no communication with regard to the actual identity of the device at each node so that an appropriate device driver could be selected and loaded. The actual identity is indicated by the global unique identifier and associated identifying information regarding the device at that node.

Currently, a host occupying one of the nodes interested in learning the unique identification of each of the devices on the bus performs a process on the bus to learn the identities of each of the devices at the nodes. The host reads the global unique identifier of each device on the bus using bus transactions. The global identifiers thus obtained are compared with the global identifiers that were present on the bus prior to the reset. Where a match is found for the global unique identifier, the rest of the identifying information for that node can be assigned to the appropriate node on the new tree. Where there is no match for a global unique identifier on the new tree, further discovery over the bus must be conducted to obtain the remaining identifying information from the configuration ROMs of the new devices. As can be seen, when there are several host systems on the bus, each wanting simultaneously to identify the devices in this manner, there will be many more bus transactions seeking the necessary information.

SUMMARY OF THE INVENTION

In accordance with an embodiment of the invention, after a reset, all data identifying connectedness between the nodes present on the bus prior to the reset is maintained. Also new data identifying connectedness between the nodes present on the bus after the reset is maintained. The host node in the old data is matched with the host node in the new data. A process identifies nodes in the new data having connections to an identified matching node that are the same as the connections of nodes in the old data to the corresponding matching node. In a preferred embodiment, the first matching nodes used in this process are the host nodes. Additional matching nodes are identified until no more can be found. Any node in the new data that fails to correspond with a node in the old data is identified as a new node. Where a node in the new data has been matched with a node in the old data, the identifying data associated with that node in the old data can be assigned to the node in the new data. The methods of embodiments of the present invention may be performed in response to the control of a computer program product in accordance with an embodiment of the invention. It is thus possible to uniquely identify a device at a node without necessarily issuing transactions on the bus to request the global unique identifier for that node.

Other objects and advantages of the invention will become apparent during the following description of the presently preferred embodiments of the invention taken in conjunction with the drawings.

DETAILED DESCRIPTION OF THE PREFERRED EMBODIMENTS

Figure 1:
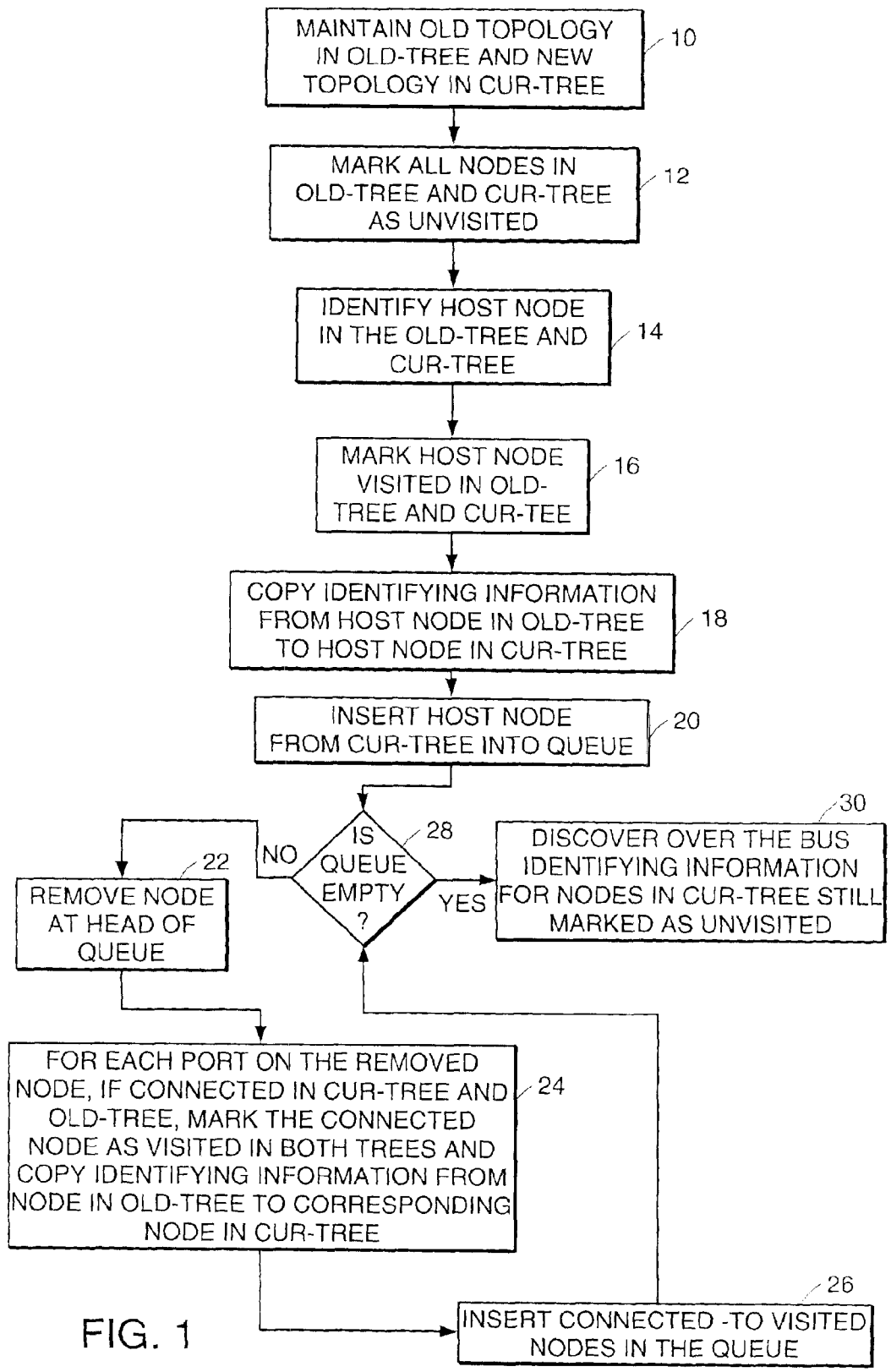
FIG. 1 is a flow chart of a method of an embodiment of the invention.

A bus reset may be initiated manually or automatically whenever a node is added to or removed from the bus. On a 1394 Firewire bus, the bus reset signal forces all nodes into a special state that clears all topology information. Referring now to FIG. 1, in accordance with an embodiment of the present invention, the topology information should be maintained 10 in a data structure, named for example "old-tree." After the bus reset signal, the bus performs a tree identification process and a self-identification process. These processes are part of the 1394 IEEE standard. The IEEE 1394-1995 specification is hereby incorporated by reference herein. Upon completing the tree identification and the self-identification processes, the new topology is known to the nodes. The new topology includes a physical I.D. for each node and the connectedness of each node to other nodes. The topology includes for each port on a node knowledge of the physical I.D. of any device connected to the node at that port. The new topology may be maintained 10 in a data structure referred to herein as "cur-tree."

Program code may be written to implement a method of an embodiment of the invention which takes advantage of having maintained the old topology and the new topology. The program code runs in a node on the bus performing identification of the devices on the bus. Any node on the bus may perform this process for the purposes of obtaining the identifying information of each of the nodes on the bus. A node performing this identification is referred to herein as a host node. Typically, a personal computer or the like will act as a host. A computer is interested in knowing the identities of the devices on the bus so that appropriate drivers may be loaded for communicating with those devices. It is envisioned that devices may also have an interest in communicating with other devices on the bus and may likewise act as a host for the purpose of obtaining the identifying information using embodiments of the current invention.

The code accesses the old-tree and the cur-tree and marks all nodes in the old-tree and the cur-tree as unvisited 12. The code is written so as to permit matching of nodes in the old tree with nodes in the cur-tree. When a node in the cur-tree has been matched with a node from the old-tree, the identification information corresponding to that node in the old tree can be assigned to the node in the current tree.

The host can readily identify itself by its physical I.D. in each of the old-tree data structure and the cur-tree data structure 14. The host maintains access to the physical I.D. that it communicated in the self-identification processes for the old-tree and the cur-tree. The host node is the first of the matching nodes to be identified in this embodiment of the program. The host node is marked as visited in both the old-tree and the cur-tree 16. Relevant identifying information of the host node found in the old-tree is copied into the corresponding host node in the cur-tree 18. The process of locating additional matching nodes is initiated by reference to the host node and identifying nodes connected thereto. Similarly connected nodes in the old-tree and cur-tree demonstrate that the node from the previously created tree (old-tree) is the same device as the corresponding node in the current tree (cur-tree). This works even if at one node, one device is swapped for another. In this case, a reset happens when the first device is removed. The trees are thus updated before the second device is inserted and another reset takes place. Thus, swapping devices at a node is actually a two—step process—remove a device and add a device. The assumption that similarly connected nodes before and after a reset are the same device is thus tenable.

The host node for the current tree is inserted into a queue 20. An algorithm is entered in which the node at the head of the queue is removed 22. For each port on the removed node, if it has a connection to another node indicated in both the current tree and the previously created tree (old-tree), then the connected node is marked as visited in both trees 24. Identifying information from the node in old-tree is copied into the corresponding node in the current tree 24. The similar connectedness between the node in old-tree and its host node as compared with the node in the current tree and its host node indicates that those nodes correspond to one another and therefore match. All such matching nodes identified in the current tree are inserted into the queue 26. The process continues so as to locate additional matching nodes indicated by their connectedness to the matching nodes that have thus far been discovered. The process is complete when the queue is empty 28. Any nodes in the current tree that are still marked unvisited fail to correspond with any node in the old-tree data structure. Such unvisited nodes are identified as new nodes that have been added during the reset. In order to obtain identifying information for these new nodes, read requests will need to be sent 30 over the bus to the nodes themselves to supply their information from their configuration ROMs. A preferred method for obtaining identifying information over the bus is described in related copending patent application entitled "Directory Structure-Based Reading of Configuration ROM", having the same assignee and filing date as the present patent application. The full disclosure of said related copending patent application is hereby incorporated by reference herein. In accordance with the method described above, the new nodes have been identified by the program code based upon access to the old tree and the current tree data, without requiring bus transactions to learn which nodes were new.

In order to clarify the method and program code as described above, an example illustrating use of the method shall now be described with references to FIGS. 2 and 3*a–f*.

Figure 2:
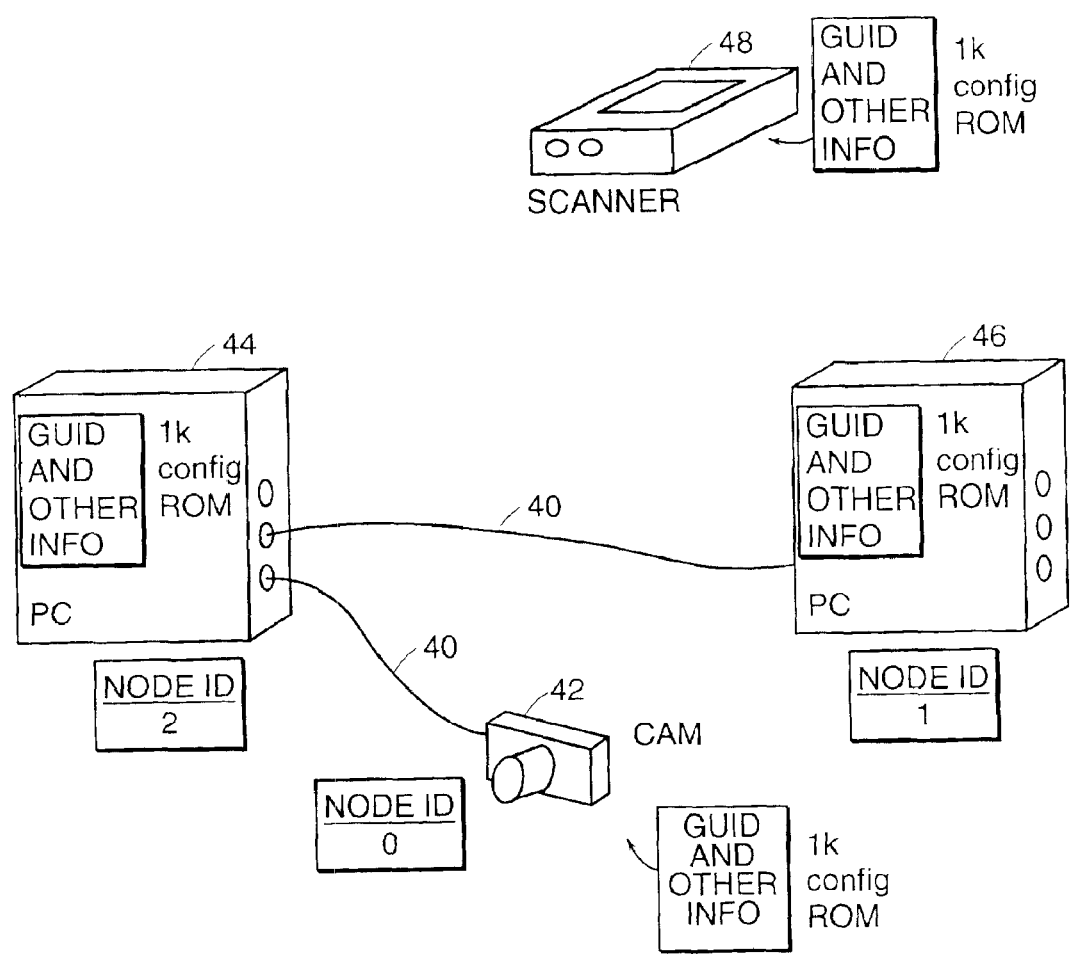
FIG. 2 is a sample illustration of a bus topology for use in illustrating the method of an embodiment of the invention.

In the example of FIG. 2, a 1394 bus 40 is used to connect a camera 42 to a personal computer 44 and to connect that personal computer 44 to a second personal computer 46. A scanner 48 is about to be added to the configuration by a bus 40 to the personal computer 44. The addition of the scanner 48 will cause a reset. A host will wish to re-identify the devices on the bus following the reset, so that it can load the appropriate device driver for each device.

Figure 3A:
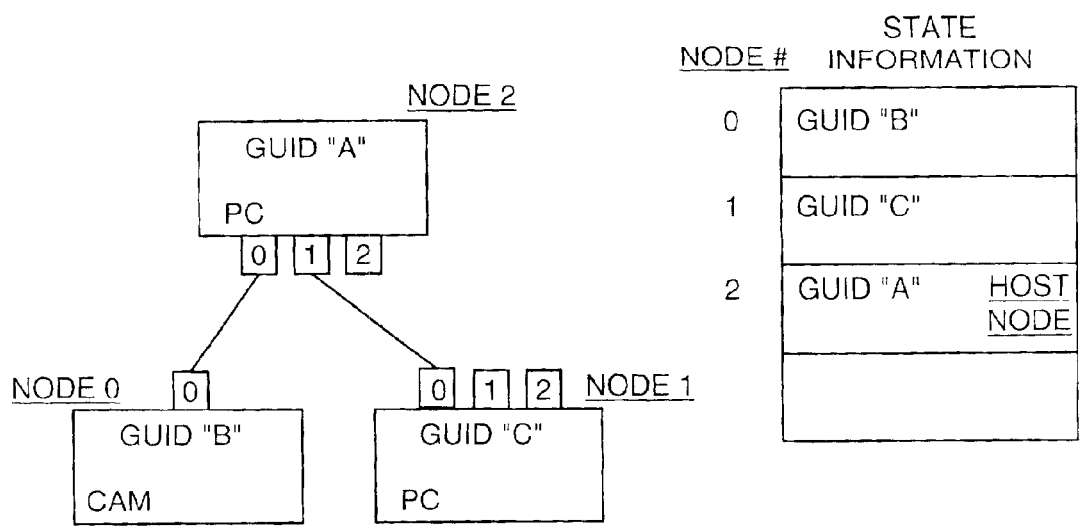
FIG. 3a–f are a series of schematic drawings to illustrate an example of the method of the invention.

Referring now to FIG. 3*a*, the topology prior to the reset is shown. The nodes carry physical I.D. numbers 0, 1 and 2. The personal computer with the global user I.D. A has been designated as the root node. The method and program code as used by the personal computer A will be described hereafter. During self-identification, it was assigned physical I.D. 2. The camera having global user I.D. B is physical node 0 and the second PC with global user I.D. C is physical node 1. The tree information includes the physical I.D. of each node, each of the port numbers on each node and an identification of the device connected to that port. Associated with each node on the tree is the global user I.D. and related identifying information, the device at the node.

Figure 3B:
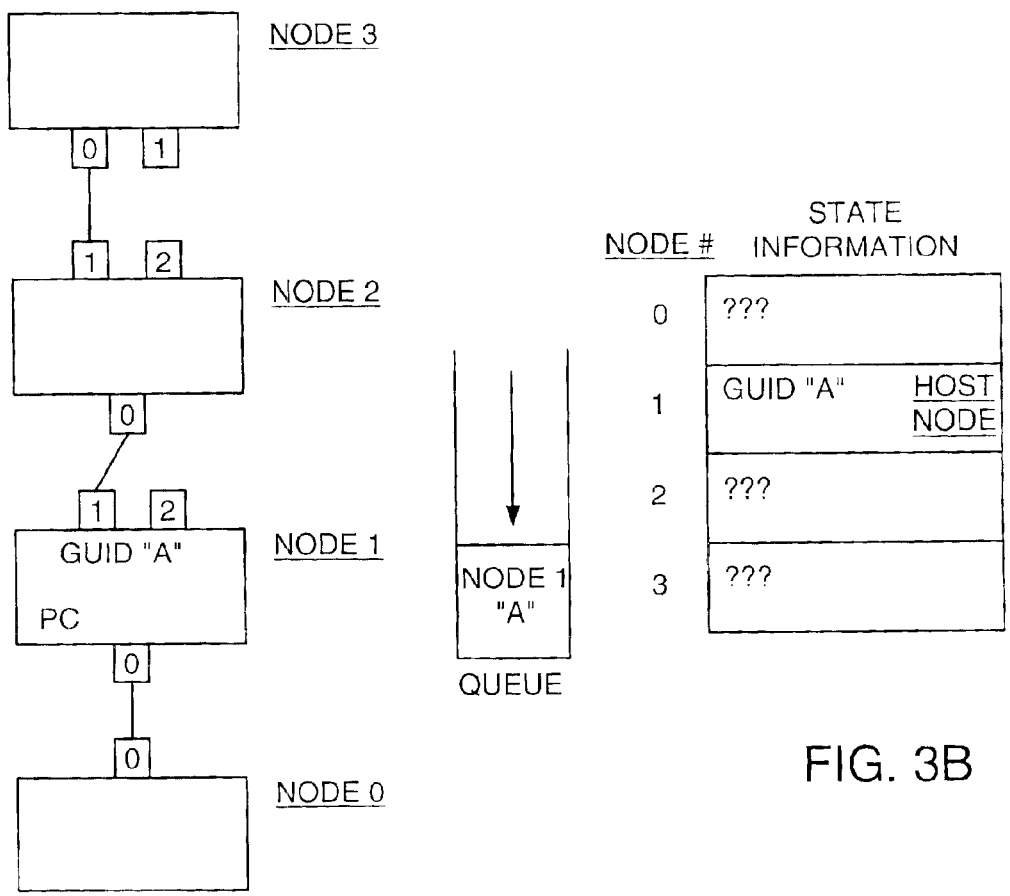
Figure 3C:
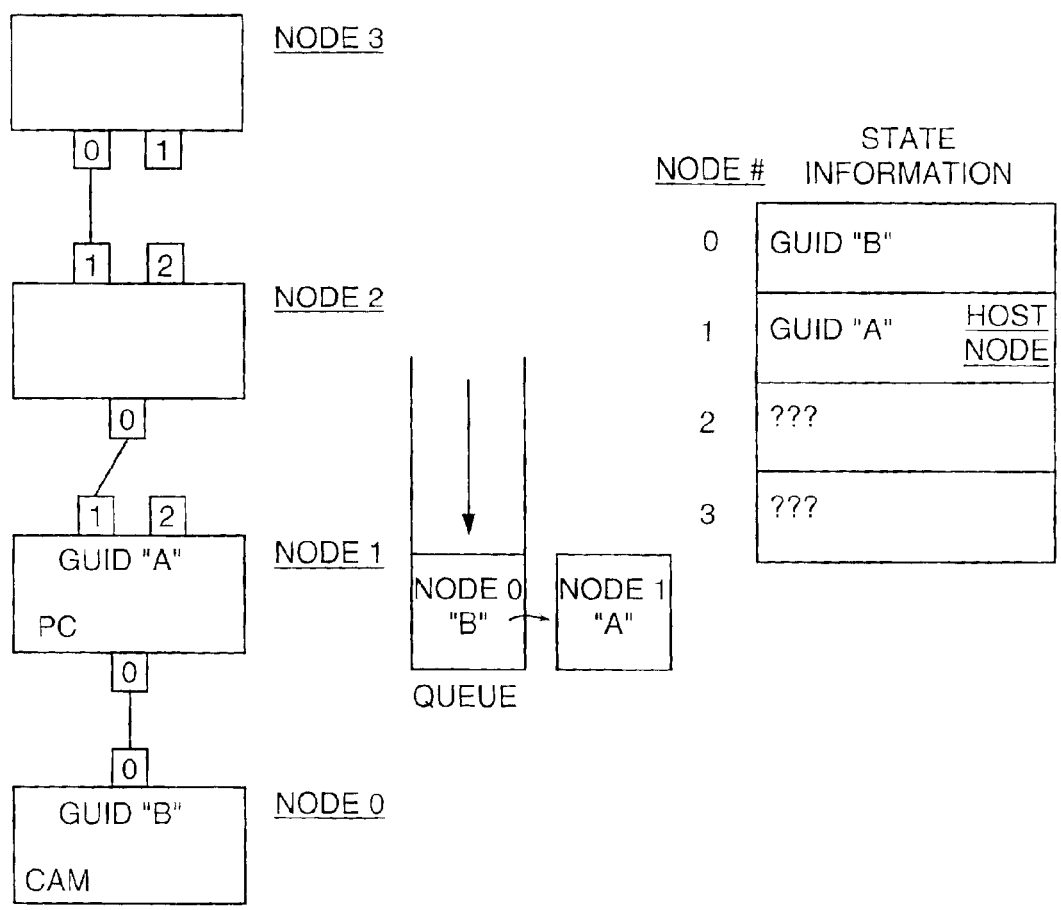
Figure 3D:
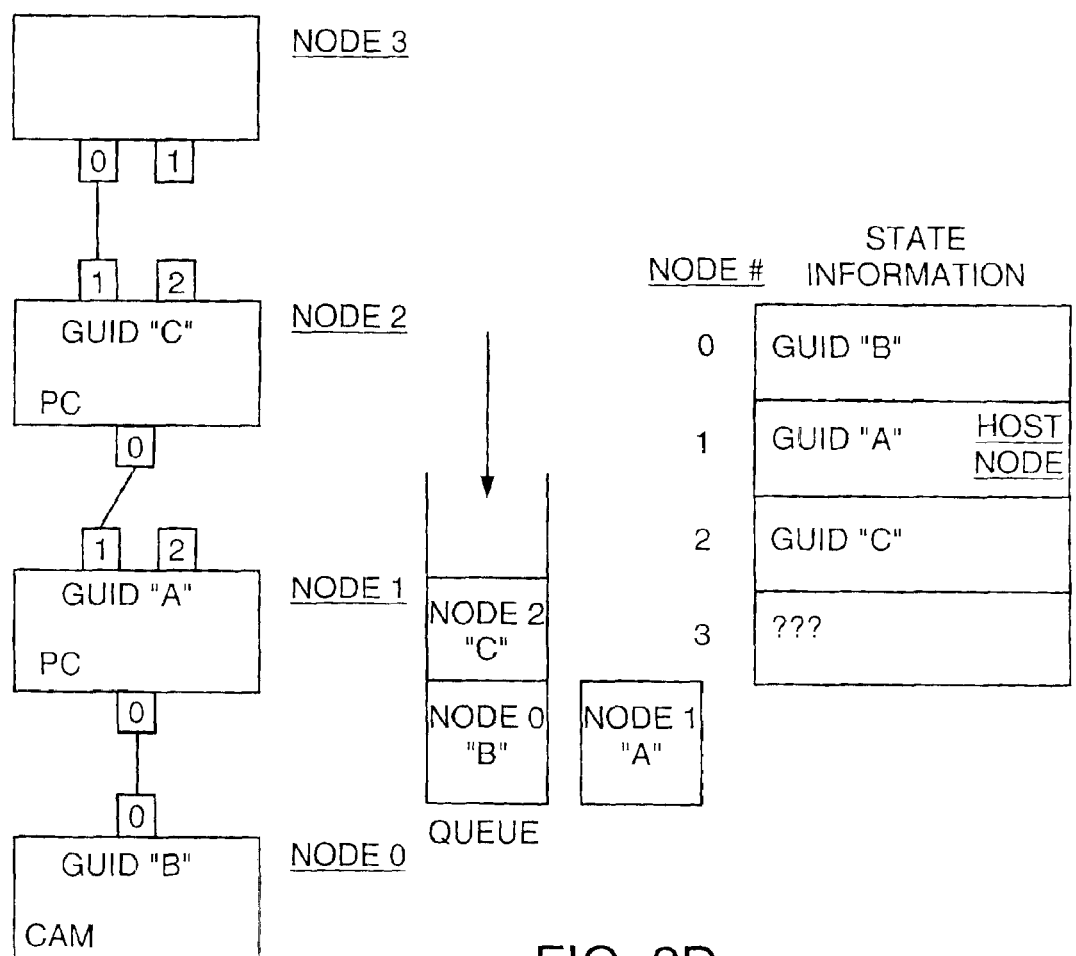

When a scanner is plugged in, a reset is initiated. A new tree is created as shown in FIG. 3. After the reset, physical node numbers are assigned afresh. The current tree topology determined after the reset indicates the connections at each of the ports at each node. The host recognizes itself in the current tree as node 1 and accesses the old tree where it recognizes itself as node 2. Thus, node 1 in the current tree matches node 2 in the old-tree. The host nodes in the old tree data and the cur-tree data are marked as visited. The identifying information for the host node is copied from the old tree into the new tree. As shown in FIG. 3*b*, the global user I.D. A and associated relevant identifying information from node 2 in the old-tree are inserted into node 1 of the current tree. A queue 100 is loaded with a reference to the host node.

In FIG. 3, the host node indicator is removed from the queue 100 and each port on the host node is checked for similar connectivity as was found in the old tree. Port 0 of the host node is currently connected to port 0 of node 0. In the old tree, port 0 of the host node 2 was similarly connected to port 0 of node 0. Therefore node 0 of the old tree and node 0 of the current tree match. These nodes are marked as visited in both trees and identifying information including the global user I.D. B is copied into the current tree state information. An indicator for this newly found matching node, node 0, is added into the queue. The remaining ports of the host node must also be checked to locate any additional matching nodes. Port 1 of the host node in the current tree is attached to port 0 of node 2. In the old tree, port 1 of the host node 2 was connected to port 0 of node 1. Therefore node 1 of the old tree and node 2 of the current tree match. The global user I.D. C and other relevant state information is copied from the old tree to the new tree as state information for node 2, as shown in FIG. 3d. A node 2 indicator is added to the queue.

Figure 3E:
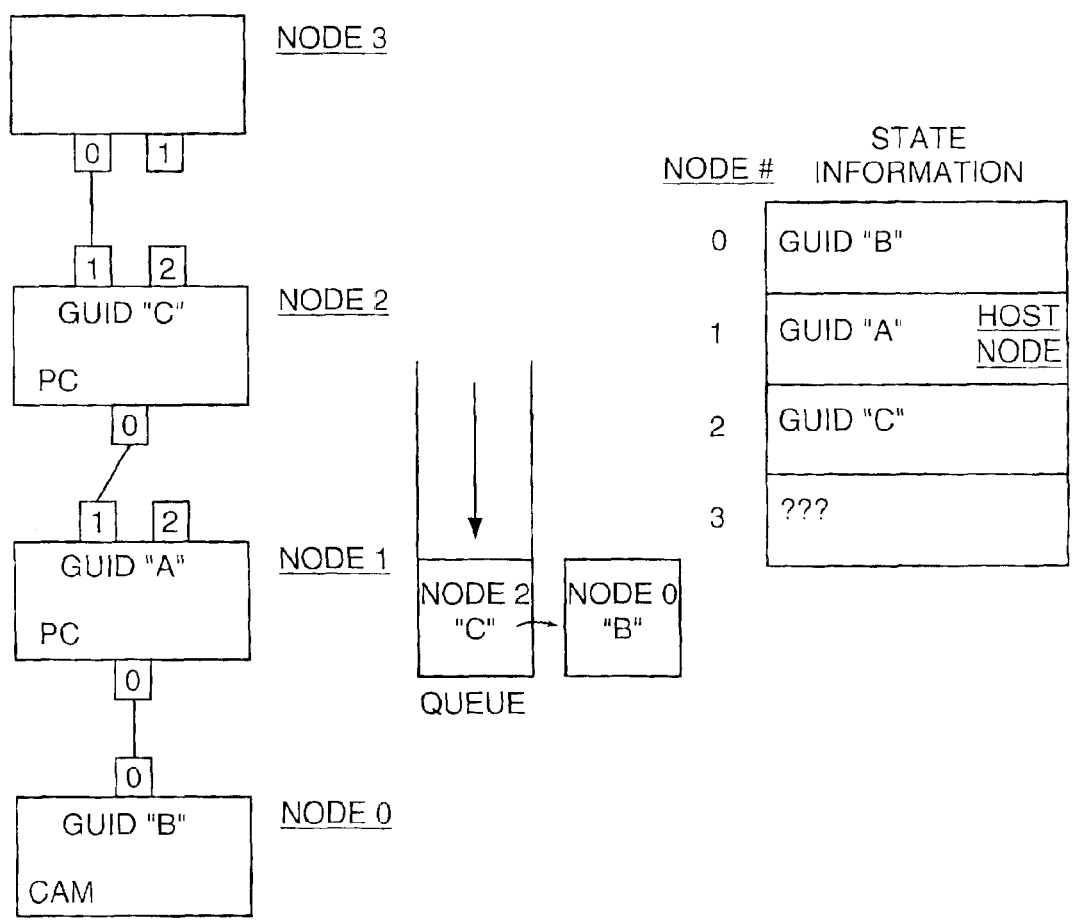

Since host node 1 has no further connected ports, the process proceeds to remove node 0 (GUID B) from the queue, as shown in FIG. 3e. However, node 0 has only a single port and this port is connected to node 1 which has already been discovered. This completes the process with respect to node 0.

Figure 3F:
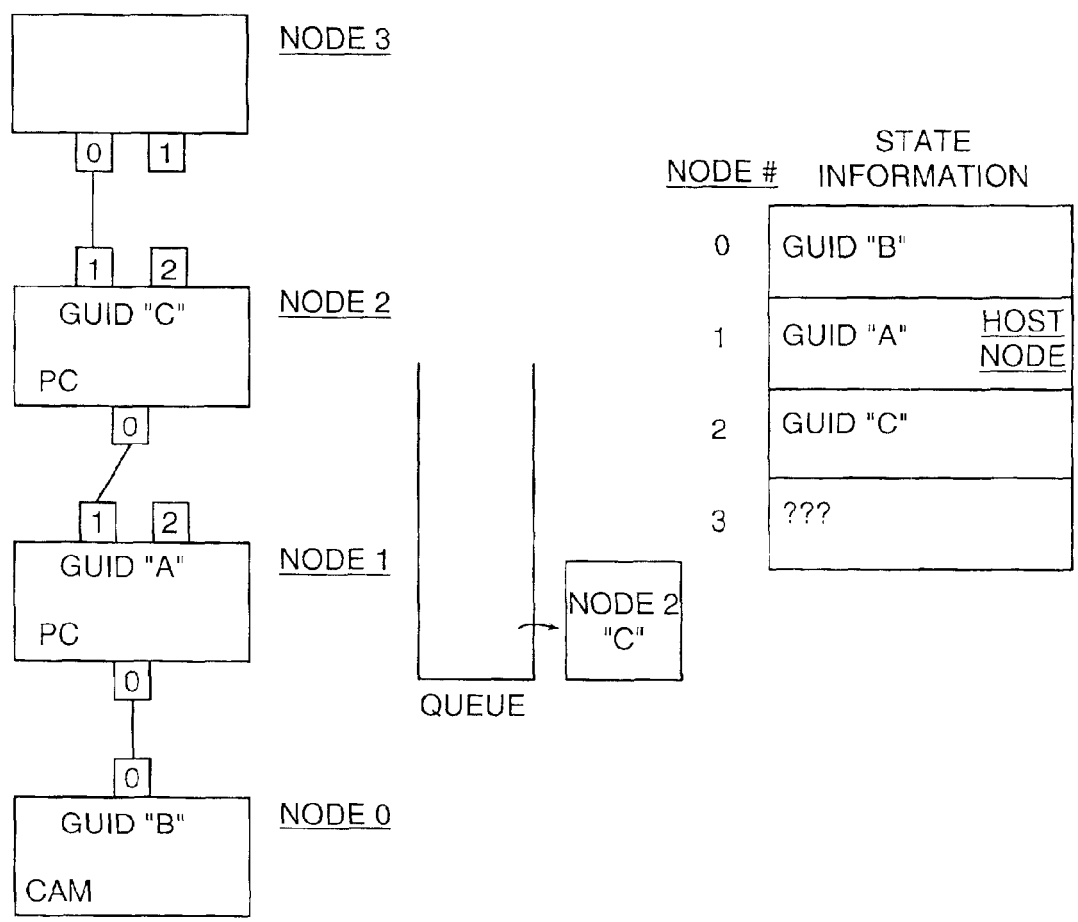

Node 2 (GUID C) is removed from the queue in FIG. 3f. Port 0 is connected to a node that has already been discovered. Port 1 of node 2 is connected to port 0 of node 3. Referring to the old tree, the matching node 1 also having GUID C has no connections to ports 1 and 2. Thus, there are no matches with the connectedness of node 1 in the old-tree. Node 2 of the current tree is removed from the queue. This empties the queue and no further matching is performed. Node 3 in the current tree was unvisited. Therefore discovery of its identity will have to be done through bus transactions. Such bus transactions were advantageously avoided for the three discovered matching nodes.

Many embodiments of the invention may be implemented in any conventional computer programming language. For example, preferred embodiments may be implemented in a procedural programming language (e.g., "C") or an object oriented programming language (e.g., "C++"). Alternative embodiments of the invention may be implemented as preprogrammed hardware elements (e.g., application specific integrated circuits and digital signal processors), or other related components.

Alternative embodiments of the invention may be implemented as a computer program product for use with a computer system. Such implementation may include a series of computer instructions fixed either on a tangible medium, such as a computer readable media (e.g., a diskette, CD-ROM, ROM, or fixed disk), or transmittable to a computer system via a modem or other interface device, such as a communications adapter connected to a network over a medium. The medium may be either a tangible medium (e.g., optical or analog communications lines) or a carrier wave medium implemented with wireless techniques (e.g., microwave, infrared or other transmission techniques). The series of computer instructions preferably embodies all or part of the functionality previously described herein with respect to the system. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web).

It should be understood that various changes and modifications to the embodiments described above will be apparent to those skilled in the art. For example, the use of a queue is not essential to completing the matching of nodes in the new data tree with nodes from the old data tree. This and other changes can be made without departing from the spirit and scope of the invention and without diminishing its attendant advantages. It is therefore intended that such changes and modifications be covered by the following claims.

We claim:

1. A method of identifying new nodes on a bus following a reset comprising:

maintaining old data identifying connectedness between nodes present on the bus prior to the reset and new data identifying connectedness between nodes present on the bus after the reset;

matching a host node in the old data with a host node in the new data such that the host nodes in the old and new data become identified as matching nodes corresponding to one another;

identifying nodes in the new data having a same connection to an identified matching node as nodes in the old data to the corresponding matching node so as to identify additional matching nodes that correspond to one another; and identifying any nodes in the new data that fail to correspond with a node in the old data.

2. The method of claim 1 further comprising requesting identifying data from each of the new nodes.

3. The method of claim 1 further comprising assigning identifying data of a matching node in the old data to the corresponding matching node in the new data.

4. A method of identifying new nodes on a bus following a reset comprising:

maintaining old data identifying connections between nodes present on the bus prior to the reset;

receiving new data identifying connections between nodes on the bus after the reset;

identifying a host node in each of the old data and the new data;

identifying one or more nodes connected to the host node in the old data;

identifying one or more matching nodes in the new data similarly connected to the host node in the new data as the one or more nodes in the old data are connected to the host node in the old data such that the matching nodes in the new data are matched with corresponding nodes in the old data;

identifying nodes in the new data similarly connected to the matching nodes in the new data as nodes in the old data are connected to the corresponding nodes in the old data so as to identify additional matching nodes in the new data matched with corresponding nodes in the old data; and identifying any nodes in the new data that fail to match with a node in the old data.

5. The method of claim 4 further comprising requesting identifying data from each of the nodes in the new data that fail to match with a node in the old data.

6. The method of claim 4 further comprising assigning a matching node in the new data with identifying data of its corresponding node in the old data.

7. A method of obtaining identifying information for nodes on a bus following a reset comprising:

comparing a new data structure mapping connections between the nodes on the bus after the reset with a previously created data structure mapping connections between nodes on the bus before the reset;

matching nodes on the new data structure to corresponding nodes on the previously created data structure by their connections to other nodes; and assigning identifying data of one of the corresponding nodes in the previously created data structure to its matching node in the data structure.

8. The method of claim 7 wherein the act of matching begins with identifying nodes on the new data structure whose connections to a host match the connections of corresponding nodes to a corresponding host in the previously created data structure.

9. The method of claim 7 further comprising requesting identifying data from over the bus for any nodes in the new data structure that fail to match with a node in the previously created data structure.

10. A computer program product for identifying new nodes on a bus following a reset, the computer program product comprising a computer usable medium having computer program code thereon, said computer program code comprising:

program code for accessing old data identifying connectedness between nodes present on the bus prior to the reset and new data identifying connectedness between nodes present on the bus after the reset;

program code for identifying a host node in the old data and a host node in the new data such that the host nodes in the old and new data become identified as matching nodes corresponding to one another;

program code for identifying nodes in the new data having a same connection to an identified matching node as nodes in the old data to the corresponding matching node so as to identify additional matching nodes that correspond to one another; and program code for identifying any nodes in the new data that fail to correspond with a node in the old data.

11. The computer program product of claim 10 further comprising program code for requesting over the bus identifying data from each of the new nodes.

12. The computer program product of claim 10 further comprising program code for assigning identifying data of a matching node in the old data to the corresponding matching node in the new data.

13. A computer program product for identifying new nodes on a bus following a reset, the computer program product comprising a computer usable medium having computer program code thereon, said computer program code comprising:

program code for accessing old data identifying connections between nodes present on the bus prior to the reset;

program code for accessing new data identifying connections between nodes on the bus after the reset;

program code for identifying a host node in each of the old data and the new data;

program code for identifying one or more nodes connected to the host node in the old data;

program code for identifying one or more matching nodes in the new data similarly connected to the host node in the new data as the one or more nodes in the old data are connected to the host node in the old data such that the matching nodes in the new data are matched with corresponding nodes in the old data;

program code for identifying nodes in the new data similarly connected to the matching nodes in the new data as nodes in the old data are connected to the corresponding nodes in the old data so as to identify additional matching nodes in the new data matched with corresponding nodes in the old data; and program code for identifying any nodes in the new data that fail to match with a node in the old data.

14. The computer program product of claim 13 further comprising program code for requesting over the bus identifying data from each of the nodes in the new data that fail to match with a node in the old data.

15. The computer program product of claim 13 further comprising program code for assigning a matching node in the new data with identifying data of its corresponding node in the old data.

16. A computer program product for obtaining identifying information for nodes on a bus following a reset, the computer program product comprising a computer usable medium having computer program code thereon, said computer program code comprising:

program code for comparing a new data structure mapping connections between the nodes on the bus after the reset with a previously created data structure mapping connections between nodes on the bus before the reset;

program code for matching nodes on the new data structure to corresponding nodes on the previously created data structure by their connections to other nodes; and program code for assigning identifying data of one of the corresponding nodes in the previously created data structure to its matching node in the data structure.

17. The computer program product of claim 16 wherein the program code for matching includes program code for identifying nodes on the new data structure whose connections to a host match the connections of corresponding nodes to a corresponding host in the previously created data structure.

18. The computer program product of claim 16 further comprising program code for requesting identifying data from over the bus for any nodes in the new data structure that fail to match with a node in the previously created data structure.

* * * * *